2 Sheets—Sheet 1.

C. STREIT.

Extension-Lounge.

No. 9,099. Reissued Feb. 24, 1880.

Attest
Chas. A. Gesert
James Moore

Inventor
Charles Streit
By Geo. J. Murray
Attorney

N. PETERS, PHOTO-LITHOGRAPHER, WASHINGTON, D. C.

C. STREIT.

Extension-Lounge.

No. 9,099. Reissued Feb. 24, 1880.

Witnesses
Chas. H. Gessert
James Moore

Inventor
Charles Streit
By Geo. J. Murray
Attorney

N. PETERS, PHOTO-LITHOGRAPHER, WASHINGTON, D. C.

UNITED STATES PATENT OFFICE.

CHARLES STREIT, OF CINCINNATI, OHIO.

EXTENSION-LOUNGE.

SPECIFICATION forming part of Reissued Letters Patent No. 9,099, dated February 24, 1880.

Original No. 84,147, dated November 17, 1868. Application for Reissue filed September 26, 1878.

*To all whom it may concern:*

Be it known that I, CHARLES STREIT, of Cincinnati, in the county of Hamilton and State of Ohio, have invented new and useful Improvements in Extension-Lounges; and I do hereby declare that the following is a full, clear, and exact description thereof.

This invention relates to the construction and arrangement of the frame and extension device in that class of lounges that are convertible into beds. Its object is to combine strength, simplicity, and cheapness with a neat and compact appearance, whether closed up or extended.

The invention consists of the combination of the principal or stationary lounge-frame, constructed with a receptacle for bedding and with bed-supporting slats, part of which are made to slide to afford access to the bed-receptacle, and an extension device adapted to close over and against said stationary frame.

It further consists in constructing the extension-frame with a front corresponding in shape to the front of the stationary frame, and with slats projecting laterally from said front at their outer ends, secured together by a connecting-strip upon their upper side, which slats form the horizontal supporting-surface of the extension-frame and an elevated head-rest, the parts being so combined that the extension-frame may shut over and against the stationary frame.

It further consists in forming recesses in the back rail of the stationary frame for receiving the stop-pins of the extension-frame, so that the slats of the latter may find a support on the said back rail, and the front of the extension-frame shut close against the front of the stationary frame when the lounge is shut or closed.

It also consists of an extension-lounge composed of a stationary frame with an elevated head-rest and an extension-frame with similar elevated head-rest attached to and moving with it, so that the frames when shut on each other form a reclining-lounge, and when drawn out form a double bedstead with an elevated head-rest extending entirely across it.

Figure 1:
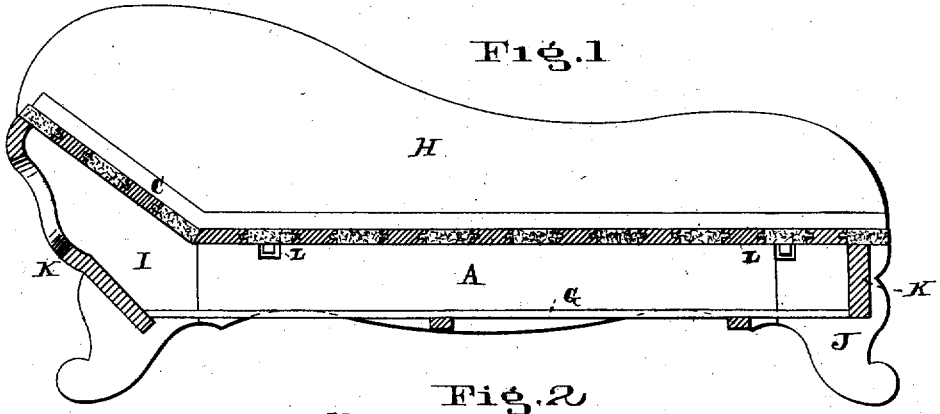
Figure 2:
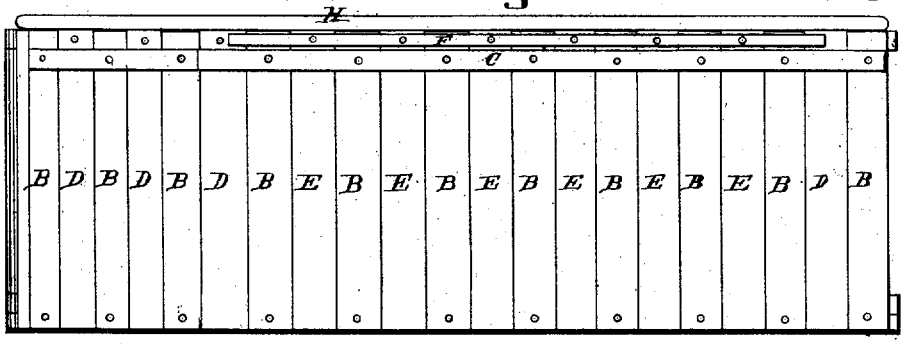
Figure 3:
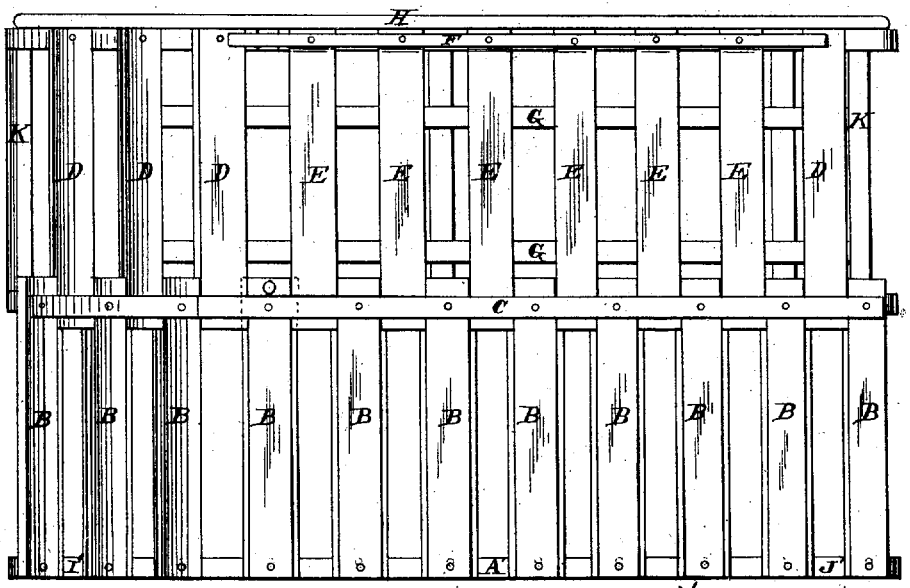
Figure 4:
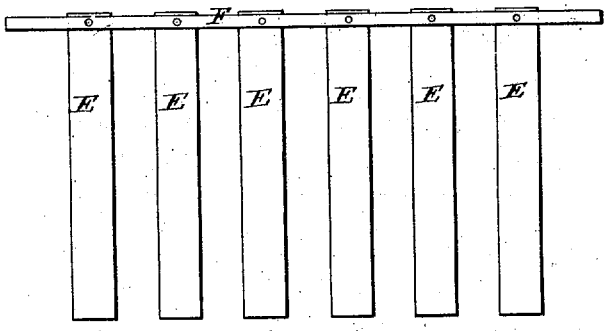
Figure 5:
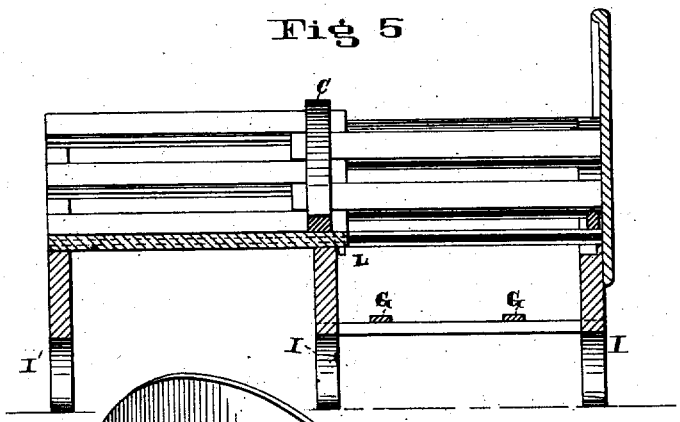
Figure 6:
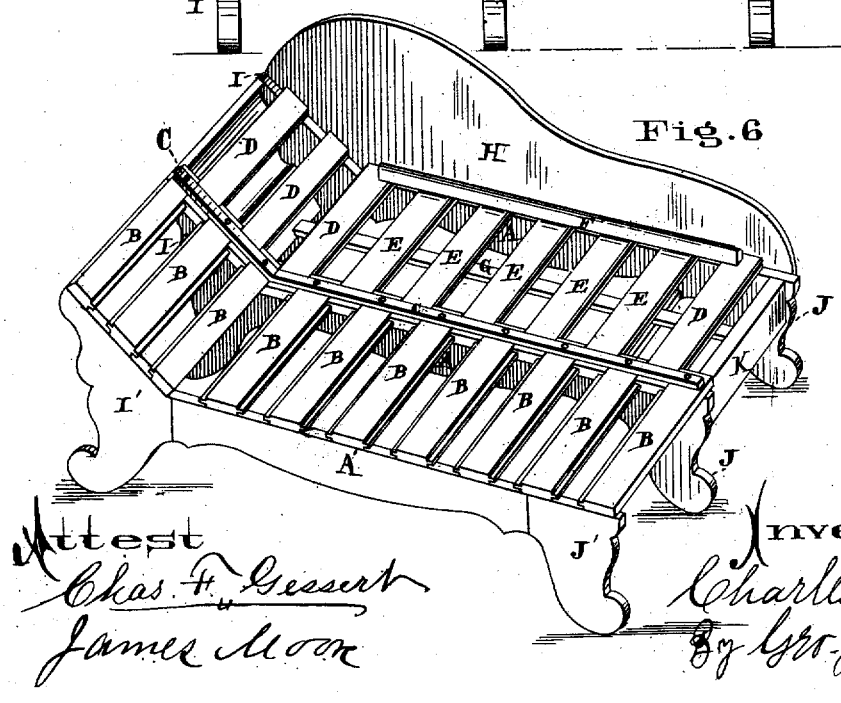

In the accompanying drawings, Figure 1 is a longitudinal sectional elevation of my improved extension-lounge as it appears when closed. Fig. 2 is a top-plan view of the same. Fig. 3 is a top-plan view of the lounge as it appears when extended. Fig. 4 is a plan of the movable connected slats for bridging the bed-receptacle of the stationary frame. Fig. 5 is a transverse vertical section of the lounge extended. Fig. 6 is a perspective view of the lounge, the parts having the same relative positions as shown in Fig. 5.

The same letters of reference are used in the designation of identical parts in all the figures.

The main or stationary frame of the lounge is constructed of the front and rear longitudinal rails, A, which are at the foot of the lounge provided with feet J, and at the head with feet I. The feet I and J are respectively connected by cross-rails K.

The feet I are constructed with inclined arms, upon which are secured several cross-slats, D, to form an elevated head-rest. Another slat, D, is fixed upon the rails A at the foot of the stationary frame.

For bridging the space between the slats of the head-rest and the single slat at the foot of the stationary frame, a number of slats, E, are provided, they being of such length that their respective ends will rest upon the front and rear rails, A, of the stationary frame. They are connected at one end to a strip, F, the ends of which project over and slide upon the cross-slat D at the foot of the lounge, and the one of the head-rest slats D nearest to that last named.

To the cross-rails K are attached longitudinal strips G, which, in connection with the rails A and K, form a receptacle within the stationary frame for the storage of the mattress and bedding when the lounge is not used as a bed.

The extension-frame of the lounge is composed of a front rail, A′, with feet I′ and J′, (all of the same size and pattern as the corresponding rails and feet of the stationary frame,) and a series of transverse slats, B, and a strip, C, fastened on top of the several slats B at their extreme ends. The slats B of the extension-frame are spaced and made of a width to enter between the slats D of the stationary frame and the movable slats E. These several slats are tongued and grooved, so as to interlock at their edges. One or more of the slats of the extension-frame are provided with stop-pins L, which project downward from the under side of said slats, and by striking against the front rail of the stationary frame, when the extension-frame is drawn out, prevent said two frames from being disconnected.

In order that the rail A′ and feet I′ and J′, composing the front of the extension-frame, may shut close up against the front of the stationary frame, and that the free ends of the slats B may slide over and be supported by the rear rail of the stationary frame when the lounge is closed, recesses are cut in said rear rail opposite to the pins L, for the reception thereof.

The upholstered cushion of the lounge is built upon the slats B of the extension-frame, or upon springs which rest upon said slats, the covering being tacked to the strip C and to the rail A′ of said extension-frame.

The upholstered back H is secured to the rear rail of the stationary frame in any suitable manner. It is to be upholstered to correspond with the upholstered cushion of the lounge; but, if desired, it may be dispensed with entirely, and the back rail of the stationary frame finished like the front of the extension-frame, so that their appearance will be alike.

When it is desired to use my extension-lounge as a bed the extension-frame is drawn out, carrying with it the slats E. This exposes the receptacle on the interior of the stationary frame, containing the mattress and bedding, which may now be removed and said slats E pushed back to bridge the bed-receptacle, their respective ends resting on the front and rear rails of the stationary frame. The mattress being now placed on the stationary frame, will be supported by the slats D and E, and will, together with the upholstered cushion of the lounge, form a double-width bed with an elevated head-rest.

I claim—

1. In an extension-lounge, the stationary frame composed of two longitudinal rails united by cross-rails, as described, having a receptacle within it for storing a bed, and upon its top slats for the support of the bed, part of which slats are made to slide so as to afford access to the bed-receptacle, in combination with an extension device adapted to close over and against said stationary frame, substantially as described.

2. An extension-lounge the movable frame of which has a rail, A′, with head and foot end pieces, I′ and J′, similar in contour to the front of the stationary frame, and is constructed with cross-slats B and connecting-strip C, all substantially as before set forth, so that said movable frame may uncover the stationary frame or close over it to cover its front and top.

3. The combination, substantially as before set forth, of the stationary frame, having depressions in its back rail, and the sliding extension-frame provided with stops adapted to enter said depressions when the frames are shut together, so that then one end of the cross-slats of the extension-frame may extend over onto the back rail of the stationary frame.

4. An extension-lounge, substantially as before set forth, composed of a stationary frame with an elevated head-rest, and an extension-frame with similar elevated head-rest attached to and moving with it, which frames, when shut on each other, form a lounge, and when drawn out form a double bedstead with an elevated head-rest extending entirely across it.

5. In an extension-lounge, the combination, substantially as specified, of three similarly-shaped longitudinal rails having corresponding feet, two of said rails being united by rails K, to form the stationary frame, with slats G below to support the mattress, and with slats D and E on top to form the support or bottom for the bed when the lounge is extended, and the third rail being provided with slats B and strip C, forming the extension device.

CHARLES STREIT.

Witnesses:
LEWIS C. BUFFINGTON,
GEO. J. MURRAY.